(12) United States Patent
Kennedy (10) Patent No.: US 10,557,566 B1
(45) Date of Patent: Feb. 11, 2020

(54) CUSHIONED RELIEF VALVE (71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 2 days.

(21) Appl. No.: 16/057,009

(22) Filed: Aug. 7, 2018

(51) Int. Cl.
*F16K 47/02* (2006.01)
*F16K 17/04* (2006.01)

(52) U.S. Cl.
CPC ........ *F16K 47/023* (2013.01); *F16K 17/0453* (2013.01)

(58) Field of Classification Search
CPC ............................ F16K 47/023; F16K 17/0453
USPC .......................................................... 137/514
See application file for complete search history.

(56) References Cited

U.S. PATENT DOCUMENTS

| | | | |
|---|---|---|---|
| 1,464,614 A | 8/1923 | Nacey et al. | |
| 4,243,070 A * | 1/1981 | Jackson | F16K 17/0453 137/510 |
| 4,437,460 A | 3/1984 | Glynn | |
| 5,186,198 A | 2/1993 | Kennedy | |
| 5,746,246 A | 5/1998 | Yokota et al. | |
| 5,771,924 A * | 6/1998 | Huygen | F16K 17/0453 137/522 |
| 6,102,072 A | 8/2000 | Yokota et al. | |
| 8,028,715 B2 | 10/2011 | Shimizu et al. | |
| 14,513,727 | 6/2016 | Kennedy | |
| 2011/0297255 A1 * | 12/2011 | Weingarten | F16K 17/0453 137/535 |
| 2016/0169398 A1 * | 6/2016 | Takahashi | F16K 15/144 137/843 |
| 2018/0074527 A1 * | 3/2018 | Kuemmerling | F16K 7/17 |

OTHER PUBLICATIONS

"Val-Matic Surge Buster Check Valves" Brochure, Val-Matic Valve & Mfg. Corp., 2013.

* cited by examiner

*Primary Examiner* — P. Macade Nichols
(74) *Attorney, Agent, or Firm* — Brown & Michaels, PC (57) ABSTRACT

A cushioned relief valve includes a housing, a piston, a cylinder cover, and a flexible diaphragm. The housing has an inlet, an interior, an outlet channel, and an outlet, the interior being a hollow cylinder in fluid communication with the inlet and the outlet channel, the outlet channel extending from a cylindrical side of the hollow cylinder to the outlet, the outlet opening outside the housing. The piston is located within the hollow cylinder and is slidable between a first position blocking the inlet and the outlet channel, and a second position opening a path for fluid flow between the inlet and the outlet channel. The cylinder cover defines a compressible gas volume in fluid communication with the second end of the hollow cylinder. The flexible diaphragm separates the compressible gas volume of the cylinder cover from the second end of the hollow cylinder.

20 Claims, 4 Drawing Sheets

CUSHIONED RELIEF VALVE

BACKGROUND OF THE INVENTION

The invention pertains to the field of fluid valves. More particularly, the invention pertains to cushioned relief valves.

Water hammer, also known as hydraulic shock, can occur in piping systems that carry a high momentum fluid when rapid changes in momentum of the fluid take place, for example, when a valve or pump in the system is abruptly closed and the fluid stops flowing. As flowing fluids generally have a constant density and mass, changes in fluid momentum result from, for example, changes in fluid flow velocity, a cessation of fluid flow, or a reversal of flow direction causing retrograde flow. When a valve or pump in the system is closed or shut off and fluid flow within the system suddenly stops, the change in fluid flow velocity causes a shockwave to form and propagate through the fluid and piping structures that carry the fluid. The shockwave may be characterized, physically and mathematically, as a transient high pressure pulse moving through the fluid flow system 20.

When the shockwave impacts valve gates, pumps and other solid structures, the energy carried by the high pressure of the shockwave is transferred to these solid structures. The shockwave pressure impacting piping, pump and valve structures is undesirable, as it is a source of unwanted acoustic noise, vibration, and extreme pressure gradients that may cause significant mechanical stress on pipes, pumps, valves, and other fixtures. In extreme cases, pipes may burst from excessive pressure extremes associated with a shockwave, or conversely may implode at a location as a result of shockwave formation at another location.

In some systems, for example lift stations bringing a fluid such as water or sewage from one elevation to a higher elevation, check valves are often used to prevent or retard retrograde fluid flow when pumping systems are turned off or valves are closed. Changes in pump status when a pump is turned off, and closing of the check valve in these systems, may cause significant hydraulic shock, particularly when large diameter pipes and large differences in elevation are involved.

In conventional systems, various solutions to mitigate hydraulic shock have been employed. In some solutions, the fundamental mitigation approach has been to either provide an alternative energy absorbing pathway for fluids to flow in, so that shockwave energy is dissipated when hydraulic shock occurs. In other approaches, the rate at which changes in flow velocity occur is regulated in order to prevent the formation of shockwaves at their source, or minimize the energy and extreme pressure increases associated with shockwaves.

Water towers, or vertical water column shunts, commonly provide alternative energy absorbing pathways. Fluids being pumped from a lower elevation to a higher elevation tend to reverse direction and produce retrograde flow back to the lower elevation when pumps are turned off or valves are closed. An open topped water tower or vertical water column located between the two elevations and at a higher elevation than a check valve, allows the retrograde flow and shockwave energy to be redirected upwardly into the tower or water column, against the force of gravity, thus harmlessly absorbing the shockwave energy and preventing hydraulic shock.

Buffers, such as tanks filled with a compressible gas, may also be incorporated in fluid systems to absorb shockwave energy and pressure, and reduce or eliminate hydraulic shock. Retrograde flow redirected toward the tank increases the fluid pressure in the tank, which in turn compresses the compressible gas, and shockwave energy is thus absorbed and then fed back into the fluid system by the initial compression and subsequent expansion of the gas after the fluid system returns to nominal operating pressures.

In other mitigation approaches, basic considerations such as valve closing rates, pump rate of stop, and length of straight-line piping between elevations may be adjusted to also reduce or eliminate hydraulic shock.

In the case of pump stoppages, hydraulic shock occurs when a pump stops suddenly, causing a sudden change in fluid flow velocity in piping connected to the pump. Adding a massive flywheel to the pump, for example, slows the rate at which pumping stops when power to the pump is removed, and thus slows the rate of change of fluid flow velocity, so that shock waves are not produced, or their pressure amplitude is minimized Alternatively, short continuous straight-line runs of piping between elevations, such as serpentine pathways, may also minimize hydraulic shock. Bends in a pipeline decrease the total mass of fluid flowing together in a section of pipe in a given direction, and therefore also decrease the total momentum of the fluid flowing in that section of pipe.

Since basic system design considerations may not always adjust to mitigate hydraulic shock, or are cost prohibitive, cushioned check valves have been developed that change the rate of check valve closing to mitigate hydraulic shock. In these conventional cushioned check valves, fluid being pumped from a lower elevation to a higher elevation may stop flowing toward the higher elevation, and reverse direction toward the lower elevation as valves are closed, or pumps stop pumping, while a check valve closes.

For example, a check valve in-line in a lift station between a lower elevation and a higher elevation requires a certain amount of time to close when movement of fluid toward the higher elevation stops, and retrograde flow begins to carry a valve disk backward toward a valve seat until the check valve closes and stops the retrograde flow. The fluid being pumped may therefore develop significant retrograde flow velocity toward the lower elevation that causes hydraulic shock with a significant amount of energy and pressure when the valve disk ultimately closes, and the retrograde flow abruptly stops.

SUMMARY OF THE INVENTION

According to an embodiment, a cushioned relief valve includes a housing, a piston, a cylinder cover, and a flexible diaphragm. The housing has an inlet, an interior, an outlet channel, and an outlet, the interior being a hollow cylinder with a first end in fluid communication with the inlet, a second end opposite the first end, and a cylindrical side between the first end and the second end, the cylindrical side in fluid communication with the outlet channel, the outlet channel extending from the cylindrical side of the hollow cylinder adjacent the first end to the outlet, the outlet opening outside the housing. The piston is located within the hollow cylinder and is slidable between a first position adjacent the first end of the hollow cylinder and a second position adjacent the second end of the hollow cylinder, the piston comprising a piston chamber inside the piston having an opening adjacent the first end of the hollow cylinder and a central aperture passing through an end of the piston opposite the opening, such that, when the piston is at the first position, the piston blocks the inlet and the outlet channel, and when the piston is in the second position, a path is opened for fluid flow between the inlet and the outlet channel. The cylinder cover defines a compressible gas volume in fluid communication with the second end of the hollow cylinder. The flexible diaphragm separates the compressible gas volume of the cylinder cover from the second end of the hollow cylinder, the diaphragm being biased toward the first end of the hollow cylinder and defining a fluid volume in the hollow cylinder between the diaphragm and the end of the piston.

According to another embodiment, a fluid flow system includes at least one pipe, at least one check valve connected to the at least one pipe, and a cushioned relief valve connected to the at least one pipe downstream from the check valve. The cushioned relief valve includes a housing, a piston, a cylinder cover, and a flexible diaphragm. The housing has an inlet, an interior, an outlet channel, and an outlet, the interior being a hollow cylinder with a first end in fluid communication with the inlet, a second end opposite the first end, and a cylindrical side between the first end and the second end, the cylindrical side in fluid communication with the outlet channel, the outlet channel extending from the cylindrical side of the hollow cylinder adjacent the first end to the outlet, the outlet opening outside the housing. The piston is located within the hollow cylinder and slidable between a first position adjacent the first end of the hollow cylinder and a second position adjacent the second end of the hollow cylinder, the piston comprising a piston chamber inside the piston having an opening adjacent the first end of the hollow cylinder and a central aperture passing through an end of the piston opposite the opening, such that, when the piston is at the first position, the piston blocks the inlet and the outlet channel, and when the piston is in the second position, a path is opened for fluid flow between the inlet and the outlet channel. The cylinder cover defines a compressible gas volume in fluid communication with the second end of the hollow cylinder. The flexible diaphragm separates the compressible gas volume of the cylinder cover from the second end of the hollow cylinder, the diaphragm being biased toward the first end of the hollow cylinder and defining a fluid volume in the hollow cylinder between the diaphragm and the end of the piston.

In another embodiment, a cushioned relief valve includes a hollow cylindrical body, a piston, a cylindrical cover, and a flexible diaphragm. The hollow cylindrical body has a first open end, a second open end opposite the first open end and an outlet channel being in fluid communication with the first open end and extending through the hollow cylindrical body. The piston is located within the hollow cylindrical body and slidable along an inner wall thereof between a first position adjacent the first open end of the hollow cylindrical body and a second position adjacent the second open end of the hollow cylindrical body, the piston comprising a first inner chamber exposed to the first open end of the hollow cylindrical body through an opening at a first end thereof and a central aperture passing through a second end thereof opposite the first end, in the first position the piston blocking the fluid communication between the first open end of the hollow cylindrical body and the outlet channel, and in the second position the piston opening the fluid communication between the first open end of the hollow cylindrical body and the outlet channel. The cylinder cover defines a second inner chamber in fluid communication with the second open end of the hollow cylindrical body. The flexible diaphragm separates the second inner chamber from the second end of the hollow cylindrical body, the diaphragm being biased toward the piston and defining a third inner chamber in the hollow cylindrical body between the diaphragm and the piston.

DETAILED DESCRIPTION OF THE INVENTION

A cushioned relief valve according to an embodiment of the current invention effectively reduces the pressure in a fluid flow system during short periods of excessive pressure. No mechanical components are added in the fluid flow system in which the cushioned relief valve is installed, thus flow rates through the fluid flow system are not negatively affected. Further, the cushioned relief valve is easily adjustable to a wide range of fluid flow velocities, fluid pressures, and pipe diameters, and is also adaptable to a wide range of fluids, including, but not limited to, for example, water, sewage, chemicals, and others.

Figure 1:
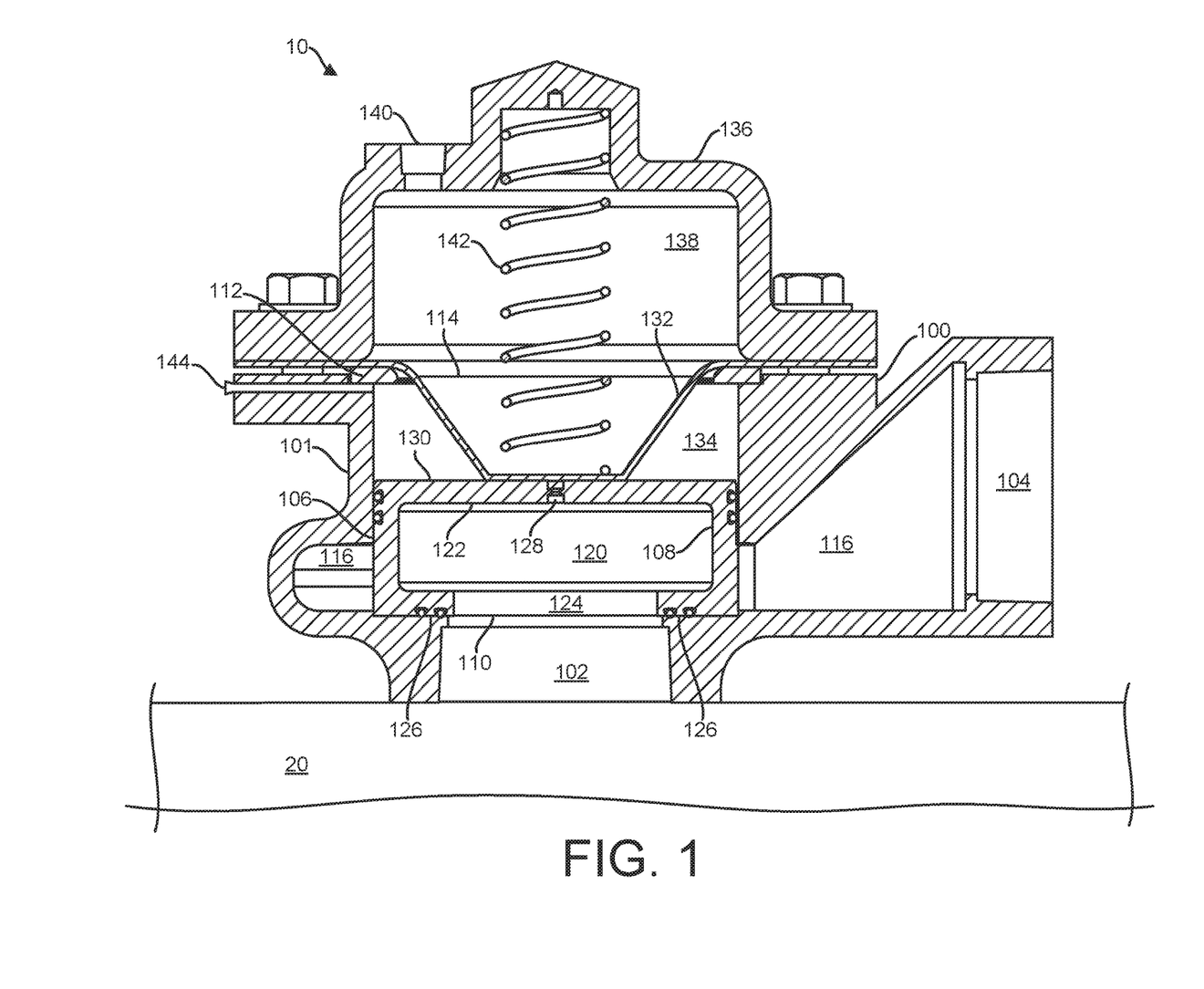
FIG. 1 shows a cushioned relief valve according to an example embodiment prior to pressurization of a fluid flow system 20 in which the cushioned relief valve is installed (in a state having a piston and a diaphragm thereof in a fully closed state).

FIG. 1 illustrates the elements of a cushioned relief valve 10 prior to pressurization of a fluid flow system 20. In this example embodiment, a valve housing 100 includes a piston housing 101 having an inlet 102 and an outlet 104. The piston housing 101 forms a hollow cylinder 106 in which a piston 108 can slide to block or open fluid communication between the inlet 102 and the outlet 104. The cushioned relief valve 10 can be connected to a fluid flow system 20, and so the inlet 102 can be in direct fluid communication with the fluid flow channel 20. A first end 110 of the hollow cylinder 106 is open to the inlet 102. Thus, according to Pascal's law, a fluid pressure at the first end 110 of the hollow cylinder 106 is the same as a fluid pressure in the inlet 102 and fluid flow system 20.

The hollow cylinder 106 is open to an outlet channel 116 at a side of the hollow cylinder 106 adjacent the first end 110 of the hollow cylinder 106. The outlet channel 116 is generally arranged to meet the first end 110 of the hollow cylinder 106 about the circumference of the hollow cylinder 106, and may do so continuously or through discreet openings passing from the outlet channel 116 into the hollow cylinder 106. The outlet channel 116 is in direct fluid communication with the outlet 104, which can outlet fluid outside the cushioned relief valve 10 and/or outside the fluid flow system 20. The outlet channel 116 and outlet 104 can be oriented at a different angle than the inlet 102. For example, the outlet channel 116 and outlet 104 can be angled approximately perpendicularly to the inlet 102, meaning that fluid flow through the inlet 102 can be approximately perpendicular to fluid flow through the outlet channel 116 and the outlet 104. "Approximate" includes plus or minus 10%, such that "approximately 90 degrees" would include the range 80-100 degrees. The outlet channel 116 can widen from the inlet 102 to the outlet 104, which can facilitate maintenance of a low pressure toward the outlet 104 (relative to the inlet 102) to draw fluid toward the outlet, or at least reduce the chance fluid flow at the outlet 104 will exceed the capacity of the outlet 104 or be obstructed at the outlet 104.

The hollow cylinder 106 houses the movable piston 108, which is generally free to move between the first end 110 of the hollow cylinder 106 and the second end 114 of the hollow cylinder 106. The hollow cylinder 106 can include a retaining ring 112 at a second end 114 of the hollow cylinder 106 in order to limit the movement of the piston 108. The piston 108 may incorporate a variety of seals, including, but not limited to, piston rings, O-rings, and other seals that prevent passage of fluid around the piston 108 into the hollow cylinder 106, or under the piston 108, between the inlet 102 and the outlet channel 116.

The piston 108 also defines a piston chamber 120 with a surface inside the piston 108. The piston chamber 120 defines a first side 122 of the piston 108. An opening 124 from the piston chamber 120 to the first end 110 of the hollow cylinder 106 is defined by an extent of a piston seal surface 126. The piston 108 also includes a central aperture 128 that allows fluid to pass through the piston 108 between the first side 122 and a second side 130 of the piston 108.

Still referring to FIG. 1, a diaphragm 132 is located at the second end 114 of the hollow cylinder 106 and forms a hermetic seal with the piston housing 101. Thus, the second side 130 of the piston 108, the diaphragm 132, and the hollow cylinder 106 define a first inner chamber 134 between the second side 130 of the piston 108 and the diaphragm 132. The diaphragm 132 is generally biased toward the first end 110 of the hollow cylinder 106, but is free to deflect away from the first end 110 of the hollow cylinder 106 and back toward the first end 110 of the hollow cylinder 106, as will be discussed further herein. Bias of the diaphragm 132 may be altered, if desired, by various constructions, including, but not limited to, a selection of material from which the diaphragm 132 is constructed, a thickness of the diaphragm 132, surface features on the diaphragm 132, and other structural features.

The valve housing 100 includes a hollow cylinder cover 136, which is located at the second end 114 of the hollow cylinder 106, and is attached to the piston housing 101. The diaphragm 132 hermetically seals the cylinder cover 136 and defines a first second inner chamber 1 that forms a gas volume inside the cylinder cover 136. The second inner chamber 138 can be filled with a compressible gas. Generally, the compressible gas is air. Any compressible gas, however, such as nitrogen, for example, or combination of compressible gasses, may be used. The pressure of the compressible gas within the second inner chamber 138 may be adjusted, for example, during initialization and optimization of the cushioned relief valve 10, by introducing or removing gas through an adjustment valve 140 that passes through the cylinder cover 136. The adjustment valve 140 can have an open position and a closed position.

The bias of the diaphragm 132 toward the first end 110 of the hollow cylinder 106 is also determined by the pressure of the gas in the second inner chamber 138. Higher gas pressures in the second inner chamber 138 provide a stronger bias, and lower pressures provide a weaker bias. A diaphragm return spring 142 may optionally be incorporated between the diaphragm 132 and the cylinder cover 136 to provide additional bias to the diaphragm 132. Thus, the diaphragm 132 bias may be determined by the construction of the diaphragm 132, the pressure of the gas in the second inner chamber 138, and optionally, the bias of the return spring 142.

Figure 2:
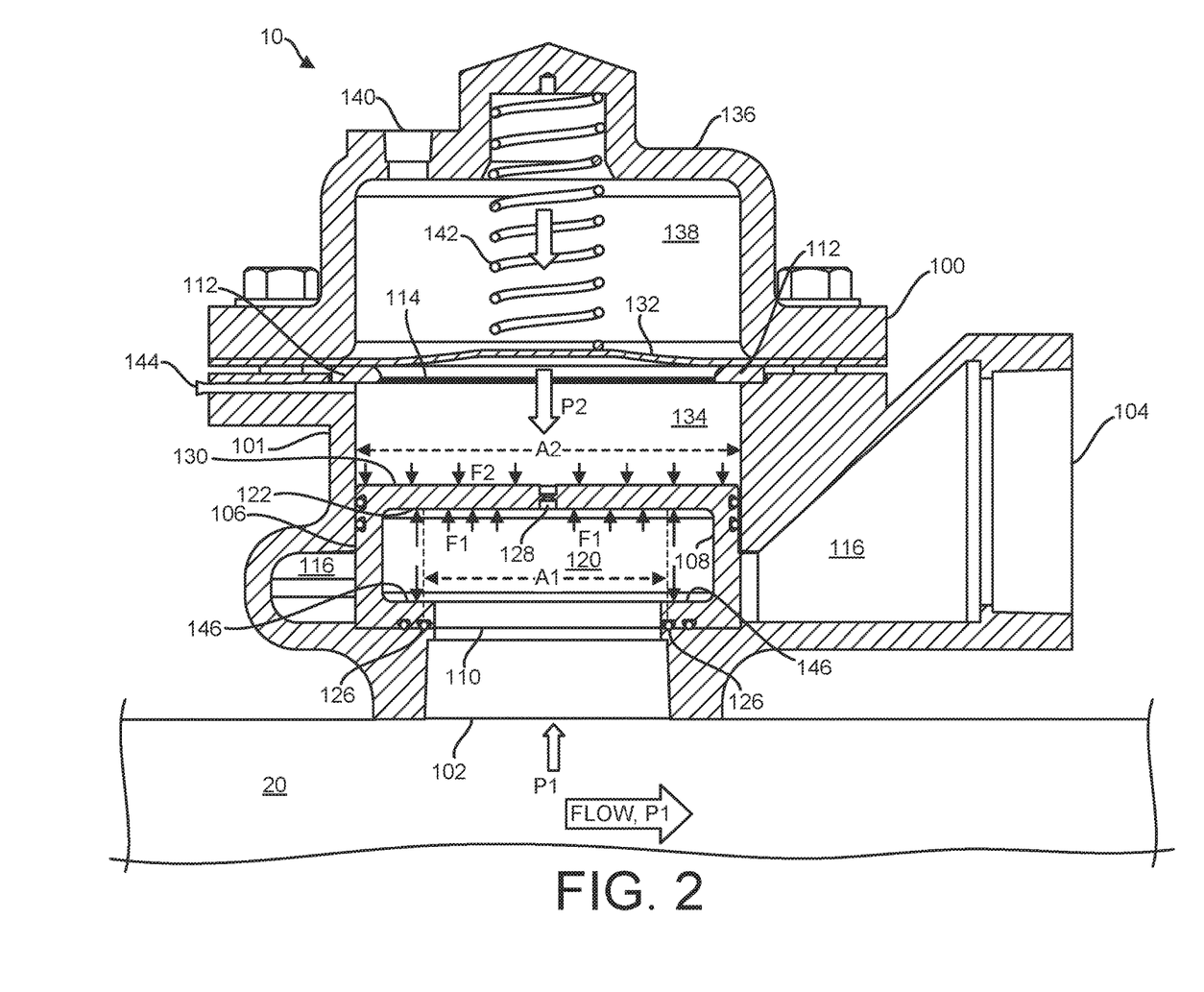
FIG. 2 shows the cushioned relief valve of FIG. 1 after initial pressurization of the fluid flow system in which the cushioned relief valve is installed (in a state having the piston closed and the diaphragm between an open (up) and closed (down) state; or after initial pressurization of the flow system and adjustment of gas pressure in the gas volume of the cylinder cover.

FIG. 2 illustrates the cushion relief valve 10 after the fluid flow system 20 in which the cushioned relief valve 10 is installed has been charged with a fluid. Fluid flow is present in the fluid flow system 20 and fluid is present at a constant, nominal operating pressure P1 in the inlet 102. No retrograde flow or hydraulic shock occurs.

When the inlet 102 is filled with fluid, the fluid flows into the first end 110 of the hollow cylinder 106, through the central aperture 128 of the piston 108, and into the first inner chamber 134. The pressure of the fluid in the inlet 102 may therefore deflect the diaphragm 132 away from the first end 110 of the hollow cylinder 106, compressing the return spring 142, if present, and the compressible gas in the second inner chamber 138, until the pressure of the fluid in the inlet 102 and the bias of the diaphragm 132 are equalized.

Gas may be introduced into the second inner chamber 138 through the adjustment valve 140. Adding gas to the second inner chamber 138 increases the gas pressure in the second inner chamber 138, and increases the bias of the diaphragm 132, which deflects the diaphragm 132 back toward the first end 110 of the hollow cylinder 106. In some embodiments, a bleeder valve 144 may be incorporated through the piston housing 101 adjacent the diaphragm 132, so that air may be bled out of the first inner chamber 134 between the piston 108 and the diaphragm 132. The first inner chamber 134, whether partially filled with air or completely filled with fluid, couples the bias of the diaphragm 132 to the second side 130 of the piston 108.

The central aperture 128 of the piston 108 is dimensioned so that fluid can flow between the first side 122 and second side 130 of the piston 108 only at a limited rate. As a result, when changes in pressure at the first end 110 of the hollow cylinder 106 occur at a rate that can be accommodated by the central aperture 128, the fluid may move through the central aperture 128 without moving the piston 108 away from the first end 110 of the hollow cylinder 106. Within these operating parameters, pressure changes that occur below a given rate, determined by the dimensions of the central aperture 128, may be absorbed by deflections of the diaphragm 132 against the diaphragm bias and the piston 108 will remain at the first end 110 of the hollow cylinder 106.

Provided the piston 108 is located at the first end 110 of the hollow cylinder 106, fluid flow from the inlet 102 to the outlet channel 116 is blocked by the piston 108. Similarly, the pressure of the fluid in the outlet channel 116 has no effect in moving the piston 108 because the pressure of the fluid in the outlet channel 116 acts laterally on the piston 108 at a perimeter of the piston 108, and lateral motion of the piston 108 is precluded by the hollow cylinder 106 defined by the cylinder housing 101.

Provided the fluid pressure in the fluid flow system 20 to which the cushioned relief valve in connected is within nominal operational ranges, in this case nominally pressure P1, and is not rapidly changing, the fluid pressure in the inlet 102 acting on the first side 122 of the piston 108, and the pressure from the diaphragm bias coupled to the second side 130 of the piston 108 through the first inner chamber 134, are equalized, and the piston 108 remains at the first end 110 of the hollow cylinder 106. The piston 108, therefore blocks the flow between the inlet 102 and the outlet channel 116, so that no fluid flows through the inlet 102 into the hollow cylinder 106, through the outlet channel 116 and the outlet 104.

FIG. 2 also shows in greater detail the forces acting on the piston 108 when fluid pressure is within nominal operating parameters. The second side 130 of the piston 108 has an area A2, and a force biasing the piston 108 toward the first end 110 of the hollow cylinder 106, shown as bold downward pointing arrows, may be calculated as:

$$F2 = P2 \times A2 \qquad \text{(Eq. 1)}$$

The opening in the piston chamber 120 to the first end 110 of the hollow cylinder 106 has an area A1 that is defined by an extent of piston seal surfaces 126 that are part of the piston 108. The projection of area A1 onto the first side 122 of the piston 108 is shown by vertical dashed lines.

Pascale's law dictates that fluid pressure is distributed uniformly in all directions, and applies to fluid pressure P1 in the piston chamber 120. As a result, forces caused by fluid pressure outside the area A1, and its projection onto the first side 122 of the piston 108 within the piston chamber 120, shown by narrow upward and downward arrows, acting on the first side 122 of the piston 108 and a surface 146 of the piston chamber 120, defined by an extent of the piston seal surfaces 126, cancel each other out, and result in a net zero force acting on the piston 108.

The remaining forces acting on the first side 122 of the piston 108 within the area A1, shown by bold arrows, may be calculated as:

$$F1 = P1 \times A1 \qquad \text{(Eq. 2)}$$

When the fluid pressure is within nominal operational parameters and equalized between first inner chamber 134 and the first end 110 of the hollow cylinder 106, P1=P2. As A1 is significantly less than A2, F2 is therefore greater than F1, and a net force acts on the second side 130 of the piston 108, and maintains the piston 108 at the first end 110 of the hollow cylinder 106 regardless of the spatial orientation of the cushion valve. The areas A1 and A2 may be selected to determine a pressure differential between P1 and P2 that would alter the relationship between F1 and F2. For example, enlarging A1 to be closer in value to A2 may reduce the amount of excess pressure at the first end 110 of the hollow cylinder 106 that would be required to move the piston 108 toward the second end 114 of the hollow cylinder 106, and vice versa.

Figure 3:
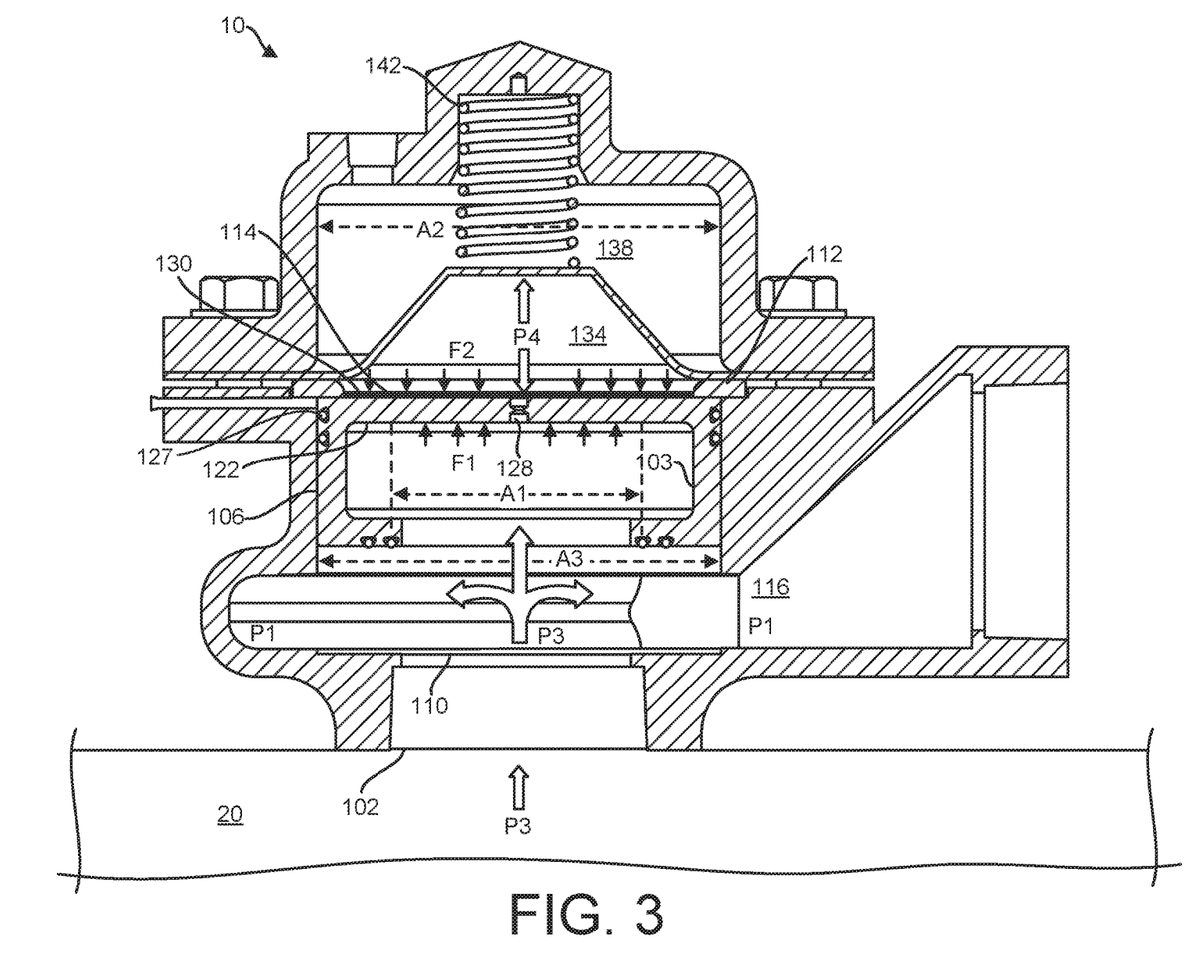
FIG. 3 shows the cushioned relief valve of FIG. 1 when a retrograde high pressure pulse enters the relief valve (in a state having the piston and the diaphragm in a fully open state).

Referring now to FIG. 3, the cushioned relief valve 10 is illustrated in a condition of relieving increased pressure in a fluid flow system 20 that can cause hydraulic shock, such as might occur when a pump driving fluid in the fluid flow system 20 stops, causing the fluid in the flow system to stop and reverse flow direction. A hydraulic shockwave or other transient high pressure pulse, with a pressure P3, can occur in the fluid flow system 20 and at the inlet 102. The inlet 102 of the cushioned relief valve can divert the fluid flow from the fluid flow system 20 and relieve the pressure P3, which is higher than the pressure P1.

The second side 130 of the piston 108, in contrast, is coupled through the first inner chamber 134 to the diaphragm 132, and is exposed to a pressure P4 that is equal to pressure P1, P2 at the onset of the hydraulic shockwave or other transient high pressure pulse. Thus, a pressure differential forms between the first side 122 of the piston 108, at the pressure P3, which is much higher than nominal operating pressure P1, and the second side 130 of the piston 108, at a pressure of P4.

In the case of hydraulic shock, the pressure differential may form at a higher rate than the central aperture 128 of the piston 108 may accommodate. Therefore, the dimensions of the central aperture 128 of the piston 108 present a hydraulic impedance, so the pressure differential across the piston 108 cannot immediately equalize through the central aperture 128.

As a result of the hydraulic impedance of the central aperture 128 of the piston 108, and the pressure differential formed between the first side 122 and the second side 130 of the piston 108, the piston 108 can be forced toward the second end 114 of the hollow cylinder 106, against the diaphragm bias coupled to the second side 130 of the piston 108 through the first inner chamber 134. The first inner chamber 134 is thus forced toward the diaphragm 132 as the piston 108 moves. The diaphragm 132 consequently deflects away from the first end 110 of the hollow cylinder 106 and compresses the gas in the second inner chamber 138, and the return spring 142 when present, until the bias of the diaphragm 132 acting on the second side 130 of the piston 108 through the first inner chamber 134 equalizes to the higher fluid pressure P3 acting on the first side 122 of the piston 108, or until the piston 108 stops against the retaining ring 112 and the fluid entering the first inner chamber 134 expands the diaphragm 132 enough to equalize the bias of the diaphragm 132 with the pressure P3.

A pressure gradient is also created between the first end 110 of the hollow cylinder 106, at pressure P3, and the outlet channel 116, still at P1. When the piston 108 moves away from the first end 110 of the hollow cylinder 106, the hollow cylinder 106 opens to the outlet channel 116, allowing fluid to flow from the inlet 102 through the hollow cylinder 106 to the outlet channel 116. Pressure in the fluid flow system 20 may thus be relieved around the fluid relief valve 10 as well as be dissipated by the deflection of the piston 108.

Applying the force balance described with respect to FIG. 2 to FIG. 3, when the piston 108 is moved from the closed position, releasing the seal at seal surface 126, the pressure P3 can act against the full area A3. In these states, the force F2 biasing the piston 108 toward the first end 110 of the hollow cylinder 106 is calculated as:

$$F2 = P2 \times A2, \qquad \text{(Eq. 1)}$$

because the pressure P4, which is equal to P2 in this state has not yet equalized to the pressure P3. The force F1 biasing the piston 108 toward the second end 114 of the hollow cylinder 106, however, is calculated as:

$$F1 = P3 \times A3 \qquad \text{(Eq. 3)}$$

When P3 is sufficiently large, the force F1 is greater than the force F2, and a net force acting on the first side 122 of the piston 108 moves the piston 108 toward the second end 114 of the hollow cylinder 106 until the piston 108 abuts against the retaining ring 112. Thus, the inlet 102 and the outlet channel 116 can communicate with each other through the hollow cylinder 106.

While in this position the retaining ring 112 overlaps against a portion of the piston 108, the overlap is not sealed, and fluid can still exert pressure out to seals 127, and across the full area A2. In this state, the force F2 acting on the second side 130 of the piston 108 is calculated as:

$$F2 = P4 \times A2 \qquad \text{(Eq. 4)}$$

The pressures P3 and P4 are average pressures, though. Looking closer along the first side 122 of the piston 108, pressures vary, with greater pressure than P3 immediately around the central aperture 128, and lower pressures than P3 at the periphery of the first side 122. This variation is due to fluid flowing out the outlet channel 116, and/or to the flow of fluid into the piston chamber 120 being directed centrally through the first end 110 after which the fluid expands to the periphery. Accordingly, after the piston 108 moves to an extreme open position against the retaining ring 112, fluid at a pressure greater than P3 is forced through the central aperture 128 of the piston 108, until the pressure immediately within the first inner chamber 134 equalizes to this pressure greater than P3, resulting in a pressure P4 also greater than pressure P3. As area A2 is equal to area A3 in this state, and P4 is greater than P3, the forces acting on the piston 108 return to a condition in which F2 is greater than F1, and the piston 108 is biased toward the first end 110 of the hollow cylinder 106.

As the piston 108 moves toward the hollow cylinder 106, closing the opening of the outlet channel 116, less pressure is drawn off the piston 108. The pressure P4 remains sufficiently greater than the pressure P3, though, to force the piston 108 to seal against the piston housing 101 at the sealing surface 126 of the piston 108, where the seal draws the area back to A1, decreasing the force F1 and increasing the bias of the piston toward the closed position at the first end 110 of the hollow cylinder 106.

When the piston 108 fully returns to the first end 110 of the hollow cylinder 106, the connection between the inlet 102 and the outlet channel 116 through the hollow cylinder 106 is again closed. Further, when the piston 108 fully returns to the first end 110 of the hollow cylinder 106 and the shockwave pressure P3 dissipates so that fluid pressure in the fluid flow system 20 returns to a nominal operating pressure P1, the diaphragm 132 bias forces fluid in the first inner chamber 134 back through the central aperture 128 of the piston 108 and into the inlet 102, such that the valve is again prepared to react to, and mitigate, subsequent shock wave events as described herein.

Movement of the piston 108, and fluid flow through the inlet 102, the hollow cylinder 106, and the outlet channel 116 lessen the small amount of retrograde flow in the fluid flow system 20 past the cushioned relief valve 10, effectively slow the rate of change of fluid pressure from P1 to P3 in the cushioned relief valve 10, and allow excess pressure to be diverted out of the fluid flow system 20, such that hydraulic shock is mitigated.

Figure 4:
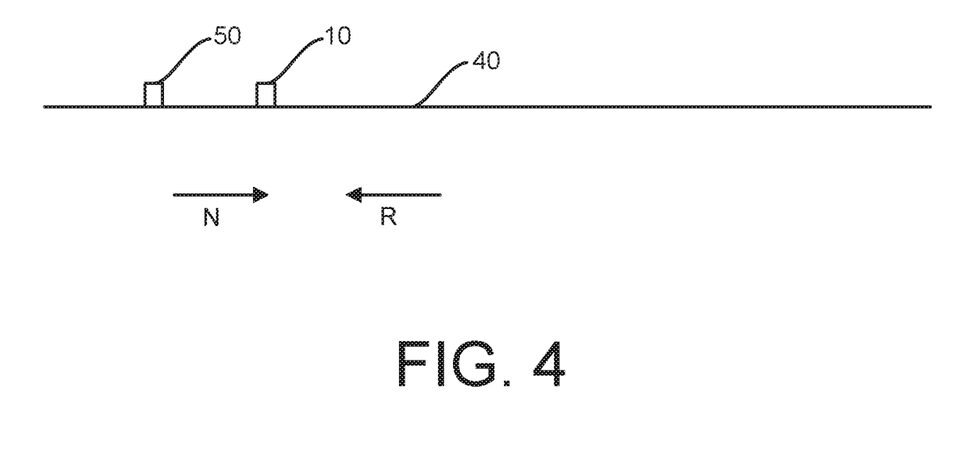
FIG. 4 is a schematic diagram of a fluid flow system according to an embodiment, including the cushioned relief valve of FIG. 1 connected at a point downstream from a check valve.

The cushioned relief valve 10 can be effective used alone, or when used in conjunction with a check valve, positioned downstream from the check valve. A check valve in a fluid flow system upstream of the cushioned relief valve 10 can be subject to hydraulic shock during a fluid flow stoppage, and the resulting shockwave can impact a closed valve disk of the check valve. FIG. 4 is a schematic diagram of a fluid flow system 40 including the cushioned relief valve 10 connected at a point downstream from a check valve 50. Normal downstream flow is indicated by an arrow labeled N, and reverse flow is indicated by an arrow labeled R. As discussed above, particularly with reference to FIG. 3, the cushioned relief valve 10 can cushion and divert a shockwave at a point in the fluid flow system downstream from the check valve 50 as the shockwave travels reverse from the normal downstream flow, thereby lessening the hydraulic shock that can occur at the check valve 50.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cushioned relief valve, comprising:
a housing having an inlet, an interior, an outlet channel, and an outlet, the interior being a hollow cylinder with a first end in fluid communication with the inlet, a second end opposite the first end, and a cylindrical side between the first end and the second end, the cylindrical side in fluid communication with the outlet channel, the outlet channel extending from the cylindrical side of the hollow cylinder adjacent the first end to the outlet, the outlet opening outside the housing;
a piston located within the hollow cylinder and slidable between a first position adjacent the first end of the hollow cylinder and a second position adjacent the second end of the hollow cylinder, the piston comprising a piston chamber inside the piston having an opening adjacent the first end of the hollow cylinder and a central aperture passing through an end of the piston opposite the opening, such that, when the piston is at the first position, the piston blocks the inlet and the outlet channel, and when the piston is in the second position, a path is opened for fluid flow between the inlet and the outlet channel;
a cylinder cover defining a compressible gas volume in fluid communication with the second end of the hollow cylinder; and
a flexible diaphragm separating the compressible gas volume of the cylinder cover from the second end of the hollow cylinder, the diaphragm being biased toward the first end of the hollow cylinder and defining a fluid volume in the hollow cylinder between the diaphragm and the end of the piston.

2. The cushioned relief valve of claim 1, wherein the outlet is oriented at an angle different from an angle at which the inlet is oriented.

3. The cushioned relief valve of claim 1, wherein the outlet channel widens from the inlet to the outlet.

4. The cushioned relief valve of claim 1, wherein the cylinder cover further comprises an adjustment valve passing through the cylinder cover between an outside of the cylinder cover and the compressible gas volume.

5. The cushioned relief valve of claim 1, further comprising a diaphragm return spring between the diaphragm and the cylinder cover, applying a bias force against the flexible diaphragm toward the first end of the hollow cylinder.

6. The cushioned relief valve of claim 1, wherein the cylinder housing further comprises a bleeder valve providing a closable path from the second end of the hollow cylinder to an outside of the cylinder housing.

7. A fluid flow system comprising:
at least one pipe;
at least one check valve connected to the at least one pipe; and
a cushioned relief valve connected to the at least one pipe downstream from the check valve,
the cushioned relief valve including:
a housing having an inlet, an interior, an outlet channel, and an outlet, the interior being a hollow cylinder with a first end in fluid communication with the inlet, a second end opposite the first end, and a cylindrical side between the first end and the second end, the cylindrical side in fluid communication with the outlet channel, the outlet channel extending from the cylindrical side of the hollow cylinder adjacent the first end to the outlet, the outlet opening outside the housing;

a piston located within the hollow cylinder and slidable between a first position adjacent the first end of the hollow cylinder and a second position adjacent the second end of the hollow cylinder, the piston comprising a piston chamber inside the piston having an opening adjacent the first end of the hollow cylinder and a central aperture passing through an end of the piston opposite the opening, such that, when the piston is at the first position, the piston blocks the inlet and the outlet channel, and when the piston is in the second position, a path is opened for fluid flow between the inlet and the outlet channel;

a cylinder cover defining a compressible gas volume in fluid communication with the second end of the hollow cylinder; and a flexible diaphragm separating the compressible gas volume of the cylinder cover from the second end of the hollow cylinder, the diaphragm being biased toward the first end of the hollow cylinder and defining a fluid volume in the hollow cylinder between the diaphragm and the end of the piston.

8. The fluid flow system of claim 7, wherein the outlet is oriented at an angle different from an angle at which the inlet is oriented.

9. The fluid flow system of claim 7, wherein the outlet channel widens from the inlet to the outlet.

10. The fluid flow system of claim 7, wherein the outlet is open to an area outside the cushioned relief valve and the fluid flow system.

11. The fluid flow system of claim 7, wherein the cylinder cover further comprises an adjustment valve passing through the cylinder cover between an outside of the cylinder cover and the compressible gas volume.

12. The fluid flow system of claim 7, further comprising a diaphragm return spring between the diaphragm and the cylinder cover, applying a bias force against the flexible diaphragm toward the first end of the hollow cylinder.

13. The fluid flow system of claim 7, wherein the cylinder housing further comprises a bleeder valve providing a closable path from the second end of the hollow cylinder to an outside of the cylinder housing.

14. A cushioned relief valve, comprising:

a hollow cylindrical body having a first open end, a second open end opposite the first open end and an outlet channel being in fluid communication with the first open end and extending through the hollow cylindrical body;

a piston located within the hollow cylindrical body and slidable along an inner wall thereof between a first position adjacent the first open end of the hollow cylindrical body and a second position adjacent the second open end of the hollow cylindrical body, the piston comprising a first inner chamber exposed to the first open end of the hollow cylindrical body through an opening at a first end thereof and a central aperture passing through a second end thereof opposite the first end, in the first position the piston blocking the fluid communication between the first open end of the hollow cylindrical body and the outlet channel, and in the second position the piston opening the fluid communication between the first open end of the hollow cylindrical body and the outlet channel;

a cylinder cover defining a second inner chamber in fluid communication with the second open end of the hollow cylindrical body; and a flexible diaphragm separating the second inner chamber from the second end of the hollow cylindrical body, the diaphragm being biased toward the piston and defining a third inner chamber in the hollow cylindrical body between the diaphragm and the piston.

15. The cushioned relief valve of claim 14, wherein the outlet channel extends at an angle with respect to the first open end and tapers outwardly by a predetermined distance from the hollow cylindrical body.

16. The cushioned relief valve of claim 15, wherein the cylinder cover comprises an adjustment valve extending therethrough to receive a compressible gas into the second inner chamber.

17. The cushioned relief valve of claim 16, further comprising:

a diaphragm return spring extending between the diaphragm and the cylinder cover to bias the diaphragm toward the piston.

18. The cushioned relief valve of claim 17, wherein the inner wall of the hollow cylindrical body is wider then the first open end thereof.

19. The cushioned relief valve of claim 18, wherein the first inner chamber is wider than the opening at the first end thereof.

20. The cushioned relief valve of claim 19, wherein the first inner chamber is wider than the first opening of the hollow cylindrical body.

* * * * *